United States Patent
Konagaya et al.

[11] Patent Number: 5,679,453
[45] Date of Patent: Oct. 21, 1997

[54] FILM CONTAINING ORGANIC PARTICLES

[75] Inventors: Shigeji Konagaya; Yasuhiro Nishino; Hideto Ohashi, all of Tsuruga, Japan

[73] Assignees: Toyo Boseki Kabushiki Kaisha, Osaka; Nippon Magphane Co. Ltd., Tokyo, both of Japan

[21] Appl. No.: 538,617

[22] Filed: Oct. 3, 1995

Related U.S. Application Data

[63] Continuation of Ser. No. 278,973, Jul. 21, 1994, abandoned, which is a continuation of Ser. No. 95,048, Jul. 22, 1993, abandoned, which is a continuation of Ser. No. 771,219, Oct. 4, 1991, abandoned.

[30] Foreign Application Priority Data

Oct. 8, 1990  [JP]  Japan ................. 2-271409

[51] Int. Cl.$^6$ .................. B32B 5/16; C08L 67/02
[52] U.S. Cl. .................. 428/327; 428/328; 428/329; 428/330; 428/331; 428/480; 428/910
[58] Field of Search .................. 428/141, 327, 428/328, 329, 330, 331, 407, 480, 910

[56] References Cited

U.S. PATENT DOCUMENTS

| | | | |
|---|---|---|---|
| 4,320,207 | 3/1982 | Watanabe et al. | 521/54 |
| 4,322,517 | 3/1982 | Deubzer et al. | 528/14 |
| 4,590,119 | 5/1986 | Kawakami et al. | 428/327 |
| 4,693,932 | 9/1987 | Kuze et al. | 428/323 |
| 4,842,936 | 6/1989 | Kashihara et al. | 428/407 |
| 4,994,312 | 2/1991 | Maier et al. | 428/36.5 |
| 5,006,589 | 4/1991 | Sakamoto et al. | 524/430 |
| 5,032,458 | 7/1991 | Dallmann et al. | 428/480 |
| 5,069,962 | 12/1991 | Okazaki et al. | 428/323 |
| 5,079,085 | 1/1992 | Hoshimoto et al. | 428/327 |

FOREIGN PATENT DOCUMENTS

| | | |
|---|---|---|
| 0229670 | 7/1987 | European Pat. Off. |
| 347646 | 12/1989 | European Pat. Off. |
| 448402 | 4/1969 | Japan |
| 4913234 | 3/1974 | Japan |
| 506493 | 3/1975 | Japan |
| 51-34272 | 3/1976 | Japan |
| 52-78953 | 7/1977 | Japan |
| 55-2225 | 1/1980 | Japan |
| 63-304047 | 12/1988 | Japan |
| 641702 | 1/1989 | Japan |
| 1249806 | 10/1989 | Japan |
| 1292059 | 11/1989 | Japan |
| 1304152 | 12/1989 | Japan |
| 1306459 | 12/1989 | Japan |
| 228131 | 6/1990 | Japan |
| 3742 | 1/1991 | Japan |

*Primary Examiner*—D. S. Nakarani
*Attorney, Agent, or Firm*—Foley & Lardner

[57] ABSTRACT

A polyester film containing organic particles comprising a matrix polymer and fine polymer particles is provided. The fine particles are interpenetrating network type cross-linked fine polymer particles, each particle containing, in its cross-linked polymer network, a hydrophilic polymer in an amount of 1 to 40% by weight which is not substantially bonded to the cross-linked polymer chemically. The cross-linked polymer is a vinyl type polymer or a siloxane type polymer comprising as its main components a polymerizable monomer and at least one cross-linking monomer contained in an amount of 5% by weight or more based on the total weight of the monomers. The interpenetrating network type cross-linked fine polymer particles have an average particle size in the range of 0.01 to 5 μm and are contained in the film in an amount of 0.001 to 5.0% by weight.

16 Claims, 2 Drawing Sheets

FILM CONTAINING ORGANIC PARTICLES

This application is a continuation of application Ser. No. 08/278,973, filed Jul. 21, 1994, now abandoned; which is a continuation of application Ser. No. 08/095,048, filed Jul. 22, 1993, now abandoned; which is a continuation of application Ser. No. 07/771,219, filed Oct. 4, 1991, now abandoned.

BACKGROUND OF THE INVENTION

1. Field of the Invention

The present invention relates to a film containing organic particles, and more particularly to a film containing organic particles excellent in transparency, wear resistance, slipperiness, surface flatness and runnability.

2. Description of the Prior Art

In general, polyester type films, polyamide type films, and polypropylene type films have been widely used for industrial and wrapping purposes. Among them, polyesters represented by polyethylene terephthalate are generally excellent in various physical and chemical properties. Because of this, polyesters are used for various applications such as fibers, moldings, and films for magnetic tapes, floppy disks, photographs, condensers, wrappings, Roentgen films, and microfilms. When polyesters are used for these films, slipperiness and wear resistance of a polyester film are the main factors influencing workability during the production and molding step of the film for various applications, and quality of the products in which these films are used.

In particular, when these films are used for magnetic tapes including magnetic materials on surfaces of polyester films, insufficient slipperiness and wear resistance of the polyester films cause the following problems.

Since friction between a film surface and a coating roller used for coating magnetic materials becomes large, wearing of the film becomes extremely vigorous, and wrinkles and abrasion are likely to occur on the surface of the film. Moreover, when the speed for feeding the film is made high in the coating and calender step for the purpose of enhancing productivity, the surface of the film is likely to be abraded. As a result, magnetic storage signals of the magnetic tape tend to be dropped out while in use. When the film with insufficient slipperiness and wear resistance is slitted (in the vertical direction) and molded into audio tapes, video tapes, and computer tapes, there arises problems. When the tape, after being molded, is rewound and drawn out of a reel, a cassette, and the like, sometimes there arise problems such as wearing, abrasion, and distortion of the tape because of the friction between the guide portion and playback head, etc. Moreover, white powders generated by the wearing, scrape, and the like of the tape, adhere to the surface of the film, resulting in the possibility of a dropout.

When polyester film is used for a video tape the demand for which has increased in recent years, the tape is scratched by a guide pin which forms white powder in the course of a high-speed dubbing from a master tape. As a result, there arises a problem in that the S/N ratio decreases and image quality becomes poor when the tape is played back.

Hitherto, various methods for improving slipperiness and wear resistance of the film has been proposed. A method for decreasing the contact area between a film and a guide roller by providing unevennesses onto the surface of the film has been known. Is known for example, an internal particle deposition method (Japanese Patent Publication Nos. 49-13234 and 50-6493) in which catalytic residues are deposited as insoluble particles from a reaction solution obtained when a polymer used for the film is synthesized; and an external particle addition method is known (Japanese Laid-Open Patent Publication Nos. 51-34272 and 52-78953, and Japanese Patent Publication Nos. 55-2225 and 55-41548) in which inactive inorganic particles are added to a polymer used for the film when the polymer is polymerized or before the polymer is extruded by fusion. In addition, a method in which organic particles are added instead of the above-mentioned inorganic particles has been known.

The internal particle deposition method has an advantage in that the affinity between the particles to be deposited and the polyester is satisfactory. However, it is difficult to regulate the amount of the particles deposited and the sizes thereof. Accordingly, there is a disadvantage in that the surface configuration of the film cannot be adjusted and the slipperiness is insufficient.

On the other hand, in the external particle addition method, the surface texture of the film can be designed more easily than that in the internal particle deposition method. However, in the case of the method in which the inactive inorganic particles are added, since the inactive inorganic particles have a poor affinity for the polymer, the dispersibility of inactive inorganic particles in the polymer, becomes poor while being blended in the polymer, and large particles are generated due to the secondary aggregation among the particles. As a result, large protrusions are formed on the surface of the film obtained, this decreasing the surface flatness. When this film is coated with magnetic materials and used as a magnetic storage medium, a drop-out is likely to occur. Moreover, even though the dispersibility of the inactive inorganic particles in the polymer is excellent, abrasion is caused on interfaces between the inactive inorganic particles and the polymer because of the poor affinity therebetween when a mixture of the inactive inorganic particles and the polymer is stretched, and voids (gaps) are formed around the inactive inorganic particles. As a result, wear resistance and transparency of the surface of the film obtained is decreased.

As a method for reducing occurrence of voids and improving wear resistance and transparency, there has been proposed a method in which an affinity between a polyester and calcium carbonate is enhanced by adding a carboxylic acid compound; a method in which an affinity between a polyester and inactive inorganic particles is enhanced by using a coupling agent; and a method in which an affinity between a polyester and inactive inorganic particles is enhanced by using a compound having a group chemically reacting with inactive inorganic particles and a group capable of transesterification with a polyester. However, even though these methods are used, sufficient affinity cannot be obtained yet and voids cannot be prevented.

As a method for adding organic particles, a method in which organic fine polymer particles comprising polystyrene copolymers, polymethacrylate ester polymers or copolymers thereof are used (Japanese Laid-Open Patent Publication Nos. 1-292059, 1-304152, and 1-306459) and a method in which semi-interpenetrating network type organic particles are used (Japanese Laid-Open Patent Publication No. 3-742) have been proposed. Since these organic particles have a strong affinity for a polyester, voids occurrence can be reduced and wear resistance and transparency can be improved. However, according to the above methods, electrical repulsion of the organic fine polymer particles or interaction between the surface of the organic fine polymer particles and the polyester are insufficient. Therefore, when these fine particles are made into a slurry which is added to a polyester, the particles aggregate to form large particles, or when these fine particles are mixed with a polyester, large particles are formed. As a result, on the surface of the film obtained, large protrusions and voids are formed, decreasing wear resistance and transparency.

SUMMARY OF THE INVENTION

The film containing organic particles of this invention, which overcomes the above-discussed and numerous other disadvantages and deficiencies of the prior art, comprises a matrix polymer and fine polymer particles dispersed in the matrix polymer, wherein the fine polymer particles are interpenetrating network type cross-linked fine polymer particles, each particle containing in its cross-linked polymer network, a hydrophilic polymer in an amount of 1 to 40% by weight which is not substantially bonded to the cross-linked polymer chemically;

the cross-linked polymer is a vinyl type polymer or a siloxane type polymer comprising as its main components a polymerizable monomer and at least one cross-linking monomer contained in an amount of 5% by weight or more based on the total weight of the monomers; and the interpenetrating network type crosslinked fine polymer particles have an average particle size in the range of 0.01 to 5 μm and are contained in the film in an amount of 0.001 to 5.0% by weight.

In a preferred embodiment, the cross-linking monomer is a vinyl monomer having two or more vinyl groups in its molecule or a silicon compound having, in its molecule, three or more functional groups capable of forming siloxane bonds.

In a preferred embodiment, the cross-linked polymer is a copolymer comprising as its main components a styrene monomer and at least one vinyl monomer having two or more vinyl groups in its molecule.

In a preferred embodiment, the cross-linked polymer is a copolymer comprising as its main components a silicon compound having, in its molecule, three or more functional groups capable of forming siloxane bonds and a silicon compound having, in its molecule, two functional groups capable of forming siloxane bonds.

In a preferred embodiment, the hydrophilic polymer is a water-soluble polymer or a water-dispersible polymer having at least one functional group selected from the group consisting of a carboxyl group, a sulfonic group, a hydroxyl group, an amino group, and salts thereof.

In a preferred embodiment, the film is an oriented polyester film.

In a preferred embodiment, the cross-linked polymer is a copolymer comprising as its main components a styrene monomer, a vinyl monomer having a functional group capable of chemically bonding to a polyester, and at least one vinyl monomer having two or more vinyl groups in its molecule.

In a preferred embodiment, the interpenetrating network type cross-linked fine polymer particles have an average particle size in the range of 0.1 to 3 μm and are contained in said film in an amount of 0.01 to 5.0% by weight.

In a preferred embodiment, the interpenetrating network type cross-linked fine polymer particles have an average particle size in the range of 0.1 to 3 μm and are contained in the film in an amount of 0.01 to 2.0% by weight, and another fine particles having a protrusion formation ability of less than 10 protrusions/mm$^2$ are contained in the film in an amount of 0.05 to 2.0% by weight.

In a preferred embodiment, the fine particles having a protrusion formation ability of less than 10 protrusions/mm$^2$ are at least one fine selected from the group consisting of high thermal conductive fine particles having a thermal conductivity of 0.01 cal/cm.sec.° C. or more and the interpenetrating network type cross-linked fine polymer particles having a particle size of less than 0.1 μm.

In a preferred embodiment, the high thermal conductive fine particles are made of a substance selected from the group consisting of beryllia, silicon carbide, aluminum nitride, titanium, spinal, alumina, magnesia, and boron nitride.

In a preferred embodiment, the interpenetrating network type cross-linked fine polymer particles have an area ratio of 80% or more with respect to a circumscribed circle defined as the following equation (I) and has a particle size variation of 20% or less defined as the following equation (II):

$$\text{Area ratio with respect to a circumscribed circle (\%)} = \frac{\text{Sum of projected areas of each particle}}{\text{Sum of areas of circles circumscribing each particle}} \times 100 \quad (I)$$

$$\text{Particle size variation (\%)} = \frac{\text{Standard deviation of particle size}}{\text{Average particle size}} \times 100 \quad (II)$$

In a preferred embodiment, a temperature at which 5% weight decrease in the interpenetrating network type cross-linked fine polymer particles is 350° C. or more in a thermal gravimetric decrease curve obtained by a thermal gravimetric analysis.

In a preferred embodiment, each of the interpenetrating network type cross-linked fine polymer particles has an inorganic fine particle as a core in its particle.

An oriented polyester film has a plurality of layers, wherein at least one outermost layer of the film contains the interpenetrating network type cross-linked fine polymer particles.

In a preferred embodiment, the oriented polyester film is obtained by applying a coating solution containing the above-mentioned interpenetrating network type cross-linked fine polymer particles and the matrix polymer onto a base film, drying the base film on which the coating solution is applied and stretching the dried film.

Thus, the invention described herein makes possible the objectives of (1) providing a film excellent in slipperiness by forming protrusions on the surface of the film; (2) providing a film excellent in runnability and surface flatness by improving dispersibility and preventing large particles from being generated; (3) providing a film excellent in wear resistance and transparency by reducing the occurrence of voids in the film; and (4) providing a film excellent in scratch resistance.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The present invention will be described in detail below.

Examples of matrix polymers used in the present invention include polyesters, polystyrenes, polypropylenes, and polyamides. In particular, a polyester is preferred. As a polyester, a crystalline polyester in which the main repeating units are ethylene terephthalate is especially preferred. The content of ethylene terephthalate is not limited and preferably in the range of 80 mol% or more. Examples of other copolymer components which can be contained in this polyester are dicarboxylic acid components and glycol components as shown below. Examples of dicarboxylic acid components include isophthalic acid, 2,6-naphthalenedicarboxylic acid, 4,4'-dicarboxyldiphenyl, 4,4'-dicarboxylbenzophenone, bis(4-carboxylphenyl)ethane, adipic acid, sebacic acid, 5-sodium sulfoisophthalic acid, and cyclohexane-1,4-dicarboxylic acid. Examples of glycol components include propylene glycol, butanediol, neopentyl glycol, diethylene glycol, cyclohexane dimethanol, ethylene oxide adducts of bisphenol A, polyethyleneglycol, polypropyleneglycol, and polytetramethyleneglycol. In addition, hydroxycarboxylic acid components such as p-hydoxybenzoic acid can also be used. Moreover, as other copolymer components, compounds having a small amount of amide bonds, urethane bonds, ether bonds, and carbonate bonds can be contained in the above polyester.

As a method for producing the above-mentioned polyester, a transesterification between a dimethyl ester of aromatic dicarboxylic acid and a glycol and a direct polymerization in which an aromatic dicarboxylic acid and a glycol are directly reacted can be used. Also, a batch type method and a continuous type method can be used. In the transesterification, there is no special limit to a catalyst. The well-known ester interchange catalyst can be used. In the direct polymerization, as an inhibitor for preventing diethylene glycol from being produced as a by-product, amines and quarternary ammonium salts can be used.

As described above, fine polymer particles which can be included in the film containing organic particles of the present invention are interpenetrating network type cross-linked fine polymer particles. These interpenetrating network type cross-linked fine polymer particles are the fine particles containing in its cross-linked polymer network a hydrophilic polymer (C) which is not substantially bonded to a cross-linked polymer chemically but is bonded by physical force. This cross-linked polymer is a vinyl type polymer or a siloxane type polymer comprising, as its main components, a polymerizable monomer (A) and a cross-linking monomer (B).

In the above cross-linked polymer, the polymerizable monomer (A) is preferably a vinyl monomer having one vinyl group in its molecule or a silicon compound having, in its molecule, two functional groups capable of forming siloxane bonds.

Examples of the vinyl monomers containing one vinyl group in its molecule include acrylic acid, methacrylic acid, and lower alkyl esters thereof such as methyl ester and ethyl ester; or glycidyl ester; maleic acid anhydride or alkyl derivatives thereof; and vinyl glycidyl ether, vinyl acetate, styrene or derivatives thereof. Among them, especially, styrene or derivatives thereof, acrylic acid, methacrylic acid or ester derivatives thereof are preferred.

When the vinyl monomer having one vinyl group in its molecule is styrene or derivatives thereof, it is preferred that a monomer (D) having a vinyl group and a functional group capable of chemically bonding to a polyester or a polyester oligomer is used together with styrene or derivatives thereof. Examples of the monomer (D) include acrylic acid, methacrylic acid, and lower alkyl esters thereof such as methyl ester and ethyl ester; or glycidyl ester; maleic acid anhydride and alkyl derivatives thereof; vinyl glycidyl ether; vinyl acetate; styrene sulfonic acid; and 2-hydroxyethylmethacrylate. Moreover, when the cross-linked polymer can be colored, vinyl type compounds containing nitrogen atoms such as N,N-dimethylacrylamide, N,N-dimethylaminopropyl acrylamide, and N,N-dimethylaminoethylacrylate resin can be used. When the above cross-linked fine polymer particles have carboxyl groups, methacrylic acid is preferably used. When the above cross-linked fine polymer particles have hydroxyl groups, an acrylic monomer having a hydroxyl group is preferably used. When the above cross-linked fine polymer particles have a sulfonic group, styrene sulfonic acid is preferably used. However, there is no special limit.

The silicon compound having, in its molecule, two functional groups capable of forming siloxane bonds is the silicon compound having two functional groups such as a halogen atom, a hydroxyl group, an alkoxyl group, an epoxy group, and an amino group. Examples of the silicon compound include dichlorodimethylsilane, dimethoxydimethylsilane, and chloromethoxydimethylsilane.

The polymerizable monomer (D) is preferably contained in an amount of 1 to 15% by weight based on the total weight of the monomers, and more preferably in an amount of 3 to 10% by weight. When the content of the polymerizable monomer (D) is less than 1% by weight, voids are likely to be formed on the interface between the surfaces of the cross-linked fine polymer particles and the matrix polymer. Therefore, there is a possibility that wear resistance deteriorates. In contrast, when the content of the polymerizable monomer (D) is more than 15% by weight, the particles are likely to aggregate, and large particles causing a drop-out may be increased. By including the polymerizable monomer (D) in the above range in the cross-linked polymer, adhesibility between cross-linked fine polymer particles and the matrix polymer becomes good, the occurrence of voids can be prevented, and wear resistance can be improved.

As the cross-linking monomer (B), a vinyl monomer having two or more vinyl groups in its molecule or a silicon compound having, in its molecule, three or more functional groups capable of forming siloxane bonds are preferable. Examples of the vinyl monomer having two or more vinyl groups in its molecule include non-conjugate divinyl compounds such as divinylbenzene and divinyl sulfone; diacrylate compounds such as polyethyleneglycol diacrylate and propyleneglycol diacrylate; triacrylate compounds such as trimethylolpropane triacrylate; tetraacrylate compounds such as tetramethylolmethane tetraacrylate; dimethacrylate compounds such as ethyleneglycol dimethacrylate and dipropyleneglycol dimethacrylate; and trimethacrylate compounds such as trimethylolpropane trimethacrylate. Among them, divinylbenezene and ethylene glycol dimatacrylate are preferred.

The silicon compound having, in its molecule, three or more functional groups capable of forming siloxane bonds is the silicon compound having three or more functional groups such as a halogen atom, a hydroxyl group, an alkoxyl group, an amino group, and an epoxy group. Examples of the silicon compound include trichloromethylsilane tetrachlorosilane trimethoxymethylsilane, and tetramethoxysilane.

When the vinyl monomer having two or more vinyl groups in its molecule is used as the cross-linking monomer (B), the polymerizable monomer (A) is the vinyl monomer having one vinyl group in its molecule. On the other hand, when the silicon compound having, in its molecule, three or more functional groups capable of forming siloxane bonds is used as the cross-linking monomer (B), the polymerizable monomer (A) is the silicon compound having, in its molecule, two functional groups capable of siloxane bonds.

The cross-linking monomer (B) forms a cross-linked structure in the course of the reaction with the polymerizable monomer (A). As a result, the cross-linked polymer obtained is neither decomposed nor softened because of heat. For example, the even though these fine polymer particles are added to the polymerization system of the matrix polymer which is to be a base film, the mixture is not thermally decomposed. Moreover, when the film obtained is stretched, the fine polymer particles are not softened so as to flow.

It is preferred that the cross-linking monomer (B) is contained in an amount of 5% by weight or more, and more preferably in an amount of 15% by weight or more based on the total weight of the monomers. Because of this, a degree of cross-linkage of the above cross-linked polymer becomes 5% or more. Here, the degree of cross-linkage refers to the content of the cross-linking monomer (B) in the total monomers forming a copolymer (cross-linked polymer) and is shown in the following equation.

$$\text{Degree of cross-linkage (\%)} = \frac{\text{Weight of Cross-linking monomer (B)}}{\text{Total weight of the monomers forming a copolymer}} \times 100$$

When the content of a cross-linking monomer (B) As less than 5% by weight, the degree of cross-linkage of the cross-linked polymer becomes less then 5%, leading to a decrease in heat resistance. Moreover, when the film obtained is stretched, the cross-linked fine polymer particles are deformed, leading to a decrease in slipperiness of the film. Furthermore, the hydrophilic polymer (C) which enters in the cross-linked polymer is likely to be released therefrom.

When the degree of cross-linkage is changed, elasticity, refractivity as well as heat resistance of the cross-linked polymer are changed. Therefore, the degree of cross-liking is selected in accordance with the applications of a film.

The polymerizable monomer (A) and the cross-linking monomer (B) can be used alone or in combinations thereof. In addition to the monomer used in the present invention, an ethylene monomer, a propylene monomer, and the like can be copolymerized. Moreover, vinyl type compounds having nitrogen atoms such as N,N-dimethylacrylamide, N,N-dimethylaminopropyl acrylamide, and N,N-dimethylaminoehtyl acrylate can be copolymerized.

As the hydrophilic polymer (C) used in the present invention, a hydrophilic polymer which is not reactive to the polymerizable monomer (A) and the cross-linking monomer (B) can be used. As the hydrophilic polymer (C), water-soluble polymers or water-dispersible polymers having at least one functional group selected from the group consisting of a carboxyl group, a sulfonic group, a hydroxyl group, an amino group, and salts thereof are preferred. More preferred examples include polyacrylic acid, polymethacrylic acid, polyacrylamide, and partial hydrolysis substances of polyacrylamide; methyl cellulose; ethyl cellulose; hydroxypropyl cellulose and the like. Considering dispersibility of the cross-linked fine polymer particles obtained with respect to a polyester, polymers having carboxyl groups such as polyacrylic acid and polymethacrylic acid are preferable.

The hydrophilic polymer (C) is contained in an amount of 1 to 40% by weight, and more preferably in an amount of 5 to 20% by weight with respect to the copolymer comprising as its main components, the polymerizable polymer (A) and the cross-linking monomer (B). When the content of the hydrophilic polymer (C) is less than 1% by weight, and the cross-linked fine polymer particles obtained are dispersed in the matrix polymer, the cross-linked fine polymer particles aggregate to form large particles, leading to a decrease in surface flatness. Moreover, compatibility between the cross-linked fine polymer particles and the matrix polymer deteriorates and voids are formed in the film obtained, leading to a decrease in wear resistance. Furthermore, when the film travels, white powders are formed, causing a drop-out. In contrast, when the content of the hydrophilic polymer compound is more then 40% by weight, the cross-linked fine polymer particles obtained are swelled with a hydrophilic compound such as water and alcohol. Therefore, when the film is biaxially stretched, the cross-linked fine polymer particles are deformed, friction coefficient is increased, and runnability and slipperiness of the film are decreased. Thus, film with a satisfactory surface cannot be produced.

The interpenetrating network type cross-linked fine polymer particles can be prepared by polymerizing the polymerizable monomer (A), the cross-linking monomer (B) and if necessary, a monomer such as the above ethylene monomer in the presence of the hydrophilic polymer (C). The well-known polymerization can used for this polymerization. For example, the interpenetrating network type cross-linked fine polymer particles are obtained in accordance with methods disclosed in Japanese Laid-Open Patent Publication Nos. 64-1702 and 1-249806. In these publications, the hydrophilic polymer (C) used as a dispersing agent is removed. In the present invention, this compound is maintained without being removed and the interpenetrating network type cross-linked polymer is obtained. When the hydrophilic polymer (C) is removed by excess washing, centrifugation and the like, desired interpenetrating network type cross-linked fine polymer particles cannot be obtained.

In the interpenetrating network type cross-linked fine polymer particles so obtained, the hydrophilic polymer (C) is not substantially bonded to the cross-linked polymer chemically through strong bonds such as a σ bond and a π bond, which is a copolymer comprising, as its main components, the polymerizable monomer (A) and the cross-linking monomer (B). The hydrophilic polymer (C) enters into the cross-linked polymer network and is bonded thereto by physical force. In the interpenetrating network type cross-linked fine polymer particles, steric hindrance on the surfaces of the particles or repulsion of the surface charge occur, so that the dispersibility of the particles added to the matrix polymer becomes satisfactory.

An average particle size of the interpenetrating network type cross-linked fine polymer particle is in the range of 0.01 to 5.0 μm, preferably in the range of 0.05 to 3.0 μm, more preferably in the range of 0.1 to 1.5 μm. When an average particle size is less than 0.01 μm, slipperiness and travel durability of the film obtained are insufficient. In contrast, when an average particle size is more than 5 μm, especially in the case of a magnetic tape, the particles dispersed in the matrix polymer form large particles, so that surface flatness of the film obtained is decreased, causing a drop-out. Moreover, wear resistance and runnability are decreased.

A content of the interpenetrating network type cross-linked fine polymer particles in the film is in an amount of 0.001 to 5.0% by weight, preferably in an amount of 0.005 to 5.0% by weight, more preferably in an amount of 0.01 to 0.1% by weight. When the content of the particles is less than 0.001% by weight, protrusion density of the surface of the film obtained is decreased, and slipperiness, runnability and wear resistance become insufficient. In contrast, when the content of the particles is more than 5.0% by weight, especially in the case of a magnetic tape, the fine particles dispersed in the matrix polymer form large particles, so that surface flatness of the film obtained is decreased, causing a drop-out.

In the present invention, shape uniformity and size of the interpenetrating network type cross-linked fine polymer particles are important factors influencing film properties. The shape of the interpenetrating network type cross-linked fine polymer particles is characterized by a ratio of the sum of projected areas of fine particles to the sum of areas of circles circumscribing a projected view of the fine particles, i.e., "the area ratio with respect to the circumscribed circle" represented by the following equation (I). "The area ratio with respect to the circumscribed circle" of the interpenetrating network type cross-linked fine polymer particles is preferably 80% or more, more preferably 90% or more, and still more preferably 95% or more.

$$\text{Area ratio with respect to a circumscribed circle (\%)} = \frac{\text{Sum of projected areas of each particle}}{\text{Sum of areas of circles circumscribing each particle}} \times 100 \quad (I)$$

According to the above equation (I), as the area ratio of the fine particles approaches 100%, the fine particles become approximately spherical shapes. When the area ratio with respect to a circumscribed circle is less than 80%, there is a possibility that slipperiness, winding property and runnability of the film obtained become insufficient.

Uniformity of the interpenetrating network type cross-linked fine polymer particles is characterized by the ratio of the standard deviation of the fine particle size to the average particle size, i.e., "a particle size variation" represented by the following equation (II). The particle size variation of the interpenetrating network type cross-linked fine polymer particles is preferably 20% or leas, more preferably 10% or less, and still more preferably 5% or less.

$$\text{Particle size variation (\%)} = \frac{\text{Standard deviation of the particle size}}{\text{Average particle size}} \times 100 \quad (II)$$

According to the above equation (II), when the particle size distribution approaches monodisperse, height and shape of the protrusions formed on the surface of the film obtained become uniform. When the degree of dispersion is more than 20%, the shape of the protrusions formed on the surface of the film obtained becomes irregular. As a result, there is a possibility that wear resistance and runnability are decreased.

As described above, when the interpenetrating network cross-linked fine polymer particles having a nearly spherical shape and relatively uniform particle size are used, the shape and height of the protrusions of the film obtained can be precisely adjusted, thereby satisfying excellent properties of flatness and slipperiness.

In the present invention, the interpenetrating network type cross-linked fine polymer particles can have minute holes on the surfaces and are hollow and porous.

The interpenetrating network type cross-linked fine polymer particles can be used alone or combinations, including two or more kinds of interpenetrating network type cross-linked fine polymer particles with different component and average particle size can be used. Moreover, other kinds of organic fine particles or inactive inorganic fine particles having satisfactory heat resistance can be used together. Examples of other organic fine particles include polystyrene fine particles, polymethacrylate fine particles, silicon polymer fine particles and cross-linked fine particles thereof; curable resin fine particles comprising, as a raw material thereof, benzoguanamine resin; polyamideimide fine particles, and phenol resin fine particles. On the other hand, examples of inactive inorganic fine particles include spherical silica, kaolin, synthetic or natural calcium carbonate, alumina, and titanium oxide. There is no special limit to the shape and size of these particles. A mixing ratio of the interpenetrating network type cross-linked fine polymer particles to these organic fine particles or inactive inorganic fine particles depends on the average particle size of the interpenetrating type cross-linked fine polymer particles to be used, so that there is no special limit.

In order to improve scratch resistance of the film, it is preferred that fine particles having a protrusion formation ability of less than 10 protrusions/mm$^2$ are added to the matrix polymer in addition to the above-mentioned interpenetrating network type cross-linked fine polymer particles which are added for the purpose of improving film properties due to protrusion formation. These fine particles are high thermal conductive fine particles having a thermal conductivity of 0.01 cal/cm.sec.° C. or more and/or the above-mentioned interpenetrating network type cross-linked fine polymer particles having a particle size of less than 0.1 µm. These fine particles have characteristics of substantially having no protrusion formation ability and of having a high thermal conductivity of the particles and/or good affinity with the matrix polymer. Here, "fine particles substantially having no protrusion formation ability" refer to fine particles in which there are less than 10 protrusions/mm$^2$ having a height of 0.27 µm or more on the surface of the film when measured by using a two-flux interference microscope. That is, it refers to fine particles in which protrusions are not substantially formed on the surface of the film, even though the particles are added to the film. Examples of the fine particles include (1) ultra-fine particles having an average particle size of 0.01 to 0.1 µm, which are either in a spherical shape or a lumpy shape, (2) fine particles having a layer-shaped structure having a thickness of 0.1 µm and (3) whiskers or fibers having a minor axis of 0.1 µm.

In view of the improvement of scratch resistance of the film obtained, the number of the protrusions having a height of 0.27 µm or more is preferably less than 10 protrusions/mm$^2$, more preferably 5 protrusions/mm$^2$ or less, and most preferably 0 protrusion/mm$^2$. When the number is 10 protrusions/mm$^2$ or more, scratch resistance of the film obtained deteriorates and white powders tend to adhere to the surface of the film. In particular, when this film is used as a magnetic tape, there is a possibility that these white powders cause the degradation of electromagnetic conversion property. When the fine particles having a thermal conductivity of less than 0.01 cal/cm.sec.° C. are used and dispersed in the matrix polymer, the fine particles are not likely to soften the matrix polymer. Therefore, the fine particles have less compatibility with respect to the matrix polymer. When the interpenetrating network type cross-linked fine polymer particles having a particle size of 0.1 µm or more are used and dispersed in the matrix polymer, the fine particles have insufficient affinity with respect to the matrix polymer. Accordingly, improved effects of the scratch resistance of the film cannot be obtained even though there are substantially no protrusion formation ability. Examples of the fine particles having a thermal conductivity of 0.01 cal/cm.sec.° C. or more include beryllia, silicon carbide, aluminum nitride, titanium, spinal, alumina, magnesia, and boron nitride.

The content of the high thermal conductive fine particles having a thermal conductivity of 0.01 cal/cm.sec.° C. or more and/or the interpenetrating network type cross-linked fine polymer particles having a particle size of less than 0.1 μm with respect to the matrix polymer, is preferably in an amount of 0.05 to 2.0% by weight, more preferably in an amount of 0.1 to 1.5% by weight, and most preferably in an amount of 0.2 to 1.0% by weight. When the content is less than 0.05% by weight, improved effects of scratch resistance becomes insufficient. When the content is more than 2.0% by weight, the fine particles aggregate in the matrix polymer to form large protrusions on the surface of the film, causing deteriorated electromagnetic conversion property and a drop-out.

Also, each of the interpenetrating network type cross-linked fine polymer particles may have an inorganic fine particle as a core in its particle. In this case, the inorganic fine particles are such as silica, calcium carbonate, alumina, arbolite, zeolite, barium sulfate, and kaolin. Those inorganic fine particles preferably have a spherical shape and a uniform particle size.

Moreover, in the above interpenetrating network type cross-linked fine polymer particles, it is preferred that the temperature at which 5% weight of the fine particles is decreased is 350° C. or more in a thermal gravimetric decrease curve obtained by a thermal gravimetric analysis. Here, the thermal gravimetric decrease curve obtained by the thermal gravimetric analysis refers to a curve showing a relationship between the temperature at which the fine particles are heated from a room temperature at 10° C./min in an atmosphere of $N_2$ and the weight of the fine particles. Since the interpenetrating network type cross-linked fine polymer particles having a 5% weight decrease temperature of 350° C. or more in the thermal gravimetric decrease curve exhibit heat resistance, when the fine particles are molded into a film after being dispersed in the matrix polymer, the fine particles are neither decomposed nor carbonized. Therefore, those fine particles are preferred.

The above interpenetrating network type cross-linked fine polymer particles are added to the matrix polymer to form a film containing these fine particles. Here, these fine particles are added in a desired step in the course of the production of the matrix polymer. The fine particles are preferably added after transesterification or between the conclusion of transesterification and the conclusion of initial polymerization. Moreover, master chips separately containing each fine particle in high concentration are prepared. These master chips are mixed with the matrix polymer containing these particles, diluted, and adjusted to an appropriate concentration. The addition of the interpenetrating network type cross-linked fine polymer particles to polymerization reaction system is either in a slurry or in a powder shape. Considering the prevention of scattering, and the improvement of supply precision and uniformity of the particles, it is preferred to be disperse as in the polyester. In particular, when the matrix polymer is a polyester, ethylene glycol is preferably added as a slurry. Concentration of the slurry is preferably in an amount of 0.5 to 20% by weight.

When the above interpenetrating network type cross-linked fine polymer particles are dispersed in a slurry, it is desired that a dispersion method in which respective interpenetrating network type cross-linked fine polymer particles do not aggregate to each other and original primary particles can be reproduced as much as possible. There is no special limit to the dispersion method of the fine particles when the slurry is prepared. For example, a rotation type high-speed stirring machine, a high voltage uniform dispersion machine, a sandmill, an ultrasonic dispersion machine or combinations thereof can be used.

When the above slurry is prepared, compounds containing phosphor atoms such as phosphoric acid, hexametasodium phosphate, polysodiumphosphate, tripolysodiumphosphate, and ammonium phosphate; compounds containing nitrogen atoms such as tetraethylammoniumhydroxide, hydroxylamine, and ammonium salts of acrylic copolymers; cationic surfactants (compounds and the like containing alkali ions such as sodium ions and potassium ions), anionic surfactants, amphoteric or non-ionic surfactants; dispersing agents such as water-soluble polymers can be used. Because of this, the dispersibility of the interpenetrating network type cross-linked fine polymer particles in the slurry and the matrix polymer are further improved. Also, at this time, when hydrophilic polymer (C) is a polymer containing carboxyl groups such as polymethacrylic acid and polyacrylic acid, it is desirable that alkali ions such as sodium ions and potassium ions are added.

Because of the addition of these dispersing agents, the surfaces of the interpenetrating network type cross-linked fine polymer particles are charged, thereby improving the dispersibility of the interpenetrating network type cross-linked fine polymer particles in the slurry and the matrix polymer. Therefore, the large particles which cause a drop-out and the like can be prevented.

In this way, the matrix polymer including the interpenetrating network type cross-linked fine polymer particles is molded into a film by an ordinary method to obtain a film containing organic fine particles. Then the film is then uniaxially or biaxially stretched, whereby the oriented film is obtained.

This oriented film can be used as it is, or this oriented film can be layered on other films and used as an oriented film having a plurality of layers. At this time, at least the outermost layer of the film having a plurality of layers is an oriented film having the above interpenetrating network type cross-linked fine polymer particles.

The film having a plurality of layers can be produced, for example, by the following methods:

A method in which the matrix polymer to which the above interpenetrating network type cross-linked fine polymer particles are added and another base polymer are molded by extrusion and stretched.

A method in which the film having the above interpenetrating network type cross-linked fine polymer particles is layered on another base film by a thermo-compression bonding and then stretched.

A method in which a coating solution containing the above interpenetrating network type cross-linked fine polymer particles and the matrix polymer is coated onto the base film, followed by stretching.

Here, as a solvent used in the coating solution, solvents such as water, alcohols, ketones, esters, and aromatic can be used.

The film including organic particles of the present invention comprises the interpenetrating network type cross-linked fine polymer particles. Such a film has the following characteristics.

(1) The interpenetrating network type cross-linked fine polymer particles have a structure in which a hydrophilic polymer interpenetrates in its cross-linked polymer network and are bonded thereto by physical force, so that the dispersibility of these fine particles in a slurry and a polymer is highly stable due to an obstruction between these fine particles in three dimensions or an repulsion of the surface charge of the particles. As a result, large particles are not formed, and runnability and surface flatness of the film become satisfactory. Moreover, voids are not formed, so that transparency and wear resistance of the film become satisfactory.

(2) The degree of cross-linkage of the interpenetrating network type cross-linked fine polymer particles is high, so that these fine particles are not thermally decomposed when being added in the course of the preparation of the matrix polymer or during the film formation step. Moreover, the fine particles do not soften and flow in the film formation step.

(3) When a vinyl monomer having a functional group capable of chemically bonding to a polyester are used as constituent component of the interpenetrating network type cross-linked fine polymer particles, the adhesion between the fine particles and a polyester is improved. Therefore, when the film obtained is biaxially stretched, voids hardly occur at the periphery of the interpenetrating network type cross-linked fine polymer particles. As a result, transparency and wear resistance of the film are further improved.

(4) When the interpenetrating network type cross-linked fine polymer particles which are nearly spherical and are monodispersed are used, the shapes of the protrusions can be precisely adjusted. Therefore, slipperiness and runnability of the film is further improved. When such fine particles are used, large particles are hardly present, so that runnability and surface flatness of the film are further improved, causing no drop-out and the like.

(5) When the interpenetrating network type cross-linked fine polymer particles which has no protrusion formation ability and which has a high thermal conductivity or a high affinity with respect to the matrix polymer are contained, scratch resistance of the film obtained becomes satisfactory.

In this way, the film containing organic fine particles of the present invention in which the interpenetrating network type cross-linked fine polymer particles are dispersed in the film is excellent in transparency, wear resistance, surface flatness, slipperiness, runnability and scratch resistance. The film containing organic particles of the present invention can be applicable to films for magnetic tapes, floppy disks, photographs, condensers and wrappings in addition to various kinds of maintenance products and moldings.

EXAMPLES

The present invention will be described by way of illustrating examples and comparative examples below. The present invention is not limited by the following examples.

Example 1

A continuous esterification reaction apparatus comprising a first esterification reactor, a second esterification reactor, a stirring apparatus, dephlegmeter, inlet for charging materials, and outlet for taking out products was used. A slurry consisting of terephthalic acid (TPA) and ethylene glycol (EG) (having a molar ratio of EG to TPA of 1.7 and containing antimony trioxide, antimony atoms being 290 ppm per TPA unit) was continuously supplied from the supply port to a system in which the esterification reaction product of TPA and EG was present in the first esterification reactor of the reaction apparatus.

At the same time, an EG solution of $(CH_3COO)_2Mg \cdot 4H_2O$ was continuously supplied from another supply port to the system so that Mg atoms be 100 ppm per polyester unit of the reaction product passing through the first esterification reactor and was allowed to react at an atmospheric pressure under the conditions that average retention time was 4.5 hours and temperature was 255° C.

The reaction product was continuously taken out from the system and was supplied to the second esterification reactor. 0.5 parts by weight of EG per polyester unit in the reaction product passing though the second esterification reactor and an EG solution of trimethylphosphate ware continuously supplied from different supply ports to the second esterification reactor so that P atoms in trimethylphosphate be 60 ppm per polyester unit in the reaction product passing through the second esterification reactor. Moreover, an EG slurry of spherical monodispersed interpenetrating network type cross-linked fine polymer particles formed from styrene, divinylbenzene, and polymethacrylic acid was continuously supplied from another supply port to the second esterification reactor so that the additional amount of the fine particles was 2000 ppm. The interpenetrating network type cross-linked fine polymer particles used in this example had a degree of cross-linkage of 9%. Therefore, the fine particles contain 9% by weight of divinylbenzene with respect to total monomers of styrene and divinylbenzene. The amount of polymethacrylic acid in the interpenetrating network type cross-linked fine polymer particles was 15% by weight and an average particle size was 1.1 µm. After the continuous supply, the reaction product was allowed to react at an atmospheric pressure under the conditions that the average retention time was 5.0 hours and the temperature was 260° C.

The esterification reaction product was continuously supplied to a two-tired continuous condensation polymerization reactor comprising a stirring apparatus, a dephlegmeter, an inlet for charging materials, and an outlet for taking out products, and condensation polymerization was effected to obtain the polyester having an intrinsic viscosity of 0.61. The polyester so obtained contained 0.2% by weight of the above interpenetrating network type cross-linked fine polymer particles.

The polyester was extruded by fusion at 290° C. and was stretched 3.5-fold in the vertical direction at 90° C. and 3.5-fold in the horizontal direction at 130° C. After that, the polyester was heat-treated at 220° C. to obtain an oriented film having a thickness of 15 µm.

Comparative Example 1

An oriented film was obtained in the same as in Example 1 except that as fine particles contained in the polyester, spherical cross-linked type fine polymer particles (with a degree of cross-linkage of 9%) obtained from styrene and divinylbenzene by a well-known method were used instead of the interpenetrating network type cross-linked fine polymer particles.

Example 2

An oriented film was obtained in the same way as in Example 1 except that as interpenetrating network cross-linked fine polymer particles, spherical monodispersed fine particles (with a degree of cross-linkage of 9% and a content of polymethacrylic acid of 15% by weight) having an average particle size of 0.7 µm were used.

Comparative Example 2

An oriented film was obtained in the same as in Example 1 except that as fine particles contained in the polyester, spherical cross-linked type fine polymer particles (with a degree of cross-linkage of 9%) having an average particle size of 0.7 μm obtained from styrene and divinylbenzene by a well-known method were used instead of the interpenetrating network type cross-linked fine polymer particles.

Example 3

An oriented film was obtained in the same way as in Example 1 except that as interpenetrating network type cross-linked fine polymer particles, spherical monodispersed fine particles (with a degree of cross-linkage of 17% and a content of polymethacrylic acid of 15%) having an average particle size of 1.2 μm were used.

Comparative Example 3

An oriented film was obtained in the same as in Example 1 except that as fine-particles contained in the polyester, spherical cross-linked type fine polymer particles (with a degree of cross-linkage of 17%) having an average particle size of 1.2 μm obtained from styrene and divinylbenzene by a well-known method were used instead of the interpenetrating network type cross-linked fine polymer particles.

Examples 4 to 6

An oriented film was obtained in the same way as in Example 1 except that as the water-soluble polymer of the interpenetrating network type cross-linked fine polymer particles contained in the polyester, interpenetrating network type cross-linked fine polymer particles using polyacrylic acid instead of polymethacrylic acid were used.

Surface flatness, slipperiness, wear resistance, runnability and number of large protrusions of the polyester films obtained in Examples 1 to 6 and Comparative Examples 1 to 3 were examined. The results are shown in Table 1.

A method for measurement of characteristics of the fine particles used and the polyester obtained will be described.

(1) Average particle size of interpenetrating network type cross-linked fine polymer particles:

Interpenetrating network type cross-linked fine polymer particles were observed by using a scanning electron microscope (Hitachi S-510). A Feret's diameter in the horizontal direction of the picture obtained was measured by using an image analysis apparatus (Luzex 500, NIRECO CO., Ltd.) to obtain an average particle size.

(2) Measurement of hydrophilic polymer (C) in interpenetrating network type cross-linked fine polymer particles:

An amount of the hydrophilic polymer (C) in the interpenetrating network type cross-linked fine polymer particles was obtained by using an elementary analysis value of the fine particles thoroughly dried. When the hydrophilic polymer (C) was a compound containing a carboxyl group, the carboxyl group was subjected to neutralization titration with sodium hydroxide for the purpose of enhancing precision of the analysis value. Then the compound was dried, after which the elementary analysis was effected to obtain the amount of the compound from the amount of Na/C.

(3) Average surface roughness (surface flatness) of film:

Surface roughness was represented as a center line average height (Ra (μm)) measured under the conditions that Surfcom 300A type surface roughness tester (Tokyo Seimitsu Co., Ltd.) with a needle diameter of 1 μm, an applied weight of 0.07 g, a measurement standard length of 0.8 mm, and a cut-off of 0.08 mm was used.

(4) Slipperiness and wear resistance of film:

A film was slitted into a thin tape shape. This tape was rubbed onto a guide pin made of metal and traveled at a high speed for a long period of time. The tension of the tape and an amount of white powders generated on the surface of the guide pin were ranked by the following five grades, respectively.

| (a) Slipperiness of film | |
|---|---|
| First class | large tension (a great amount of abrasion) |
| Second class | relatively tension (a relatively great amount of abrasion) |
| Third class | middle tension (a small amount of abrasion) |
| Forth class | relatively small tension (almost no abrasion) |
| Fifth class | small tension (no abrasion) |
| (b) Wear resistance of film | |
| First class | extremely great amount of white powder |
| Second class | great amount of white powder |
| Third class | relatively great amount of white powder |
| Forth class | almost no white powder |
| Fifth class | no white powder |

Figure 1:
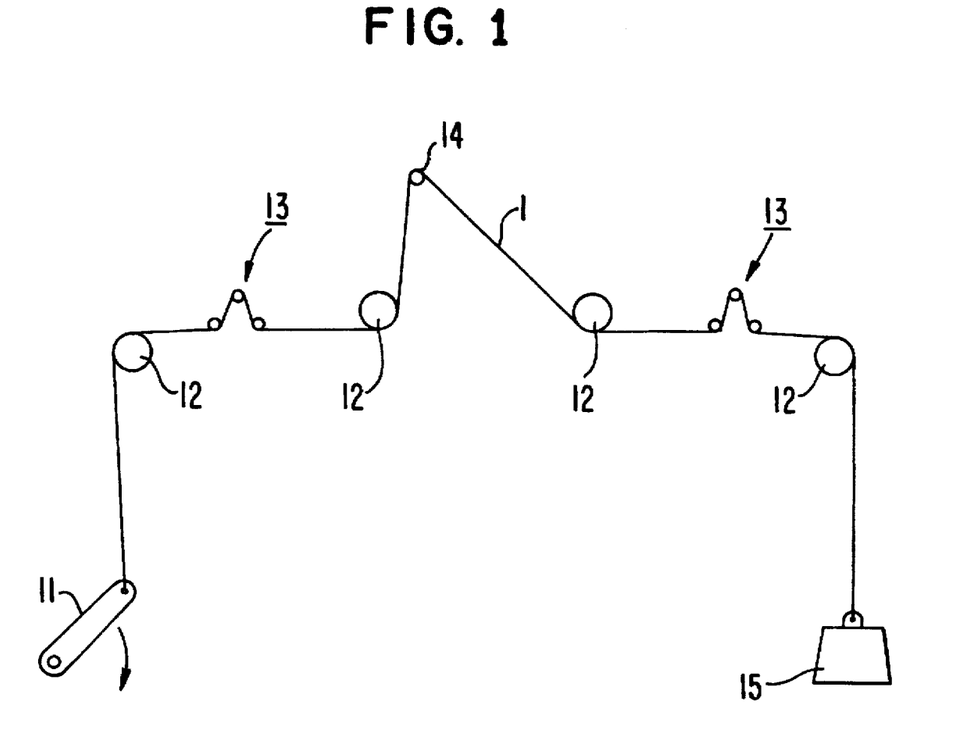
FIG. 1 is a schematic diagram showing an apparatus for evaluating runnability of the film.

(5) Runnability of film:

Runnability of the film was measured by using an apparatus shown in FIG. 1. With reference to FIG. 1, a weight 15 was provided at one end of the tape. The tape passed through a free roller 12, a tension inspecting apparatus 13, and a free roller 12, and came into contact with a VTR guide pin 14 which was commercially available. Then, the tape passed through a free roller 12, a tension inspecting apparatus 13 and a free roller 12, and the other end of the tape was fixed to a crank 11. The crank 11 was rotated with the tape being in contact with the VTR guide pin 14, whereby the tape was traveled. The runnability was measured.

The measurement was conducted under the conditions that the temperature was 23° C. and the relative humidity was 65%. A rough surface of the polyester film 1 was in contact with the VTR guide pin 14 for household purposes at an angle of 3/4π (unit: radian), and a constant weight of 50 g was applied thereto. The crank 11 was rotated at 8.0 rpm and the film 1 was traveled 100 times. During this time, the increases in coefficient of dynamic friction and coefficient of static friction compared with initial coefficient of dynamic friction and initial coefficient of static friction (Δμkd and Δμks) were ranked by five grades, respectively. As the VTR guide pin 14, a VTR guide pin having a maximum protrusion height of 0.15 μm and a center line average roughness of 0.008 μm measured by using a surface roughness tester of a tracer method type was used.

| First class | increase in coefficient of friction was 0.2 or more |
|---|---|
| Second class | 0.15 to 0.20 |

-continued

| | |
|---|---|
| Third class | 0.10 to 0.15 |
| Forth class | 0.05 to 0.10 |
| Fifth class | less than 0.05 |

(6) Number of large protrusions on surface of film:

Aluminium was thinly vapor-deposited on the surface of the film. After that, the number of large protrusions having a height of 1.08 μm or more (number of protrusions per a measurement area of 1 mm²) was counted by using a double flux interference microscope. The number obtained was ranked as follows.

| | |
|---|---|
| First class | 16 or more protrusions/mm² |
| Second class | 12 to 15 protrusions/mm² |
| Third class | 8 to 11 protrusions/mm² |
| Forth class | 4 to 7 protrusions/mm² |
| Fifth class | 0 to 3 protrusions/mm² | first esterification reactor and was allowed to react at atmospheric pressure under the conditions that average retention time was 4.5 hours and temperature was 255° C.

The reaction product was continuously taken out from the system and was supplied to the second esterification reactor. 0.5 parts by weight of EG per polyester unit in the reaction product passing though the second esterification reactor and an EG solution of trimethylphosphate were continuously supplied form different supply ports to the second esterification reactor so that P atoms in trimethylphosphate be 75 ppm per polyester unit in the reaction product passing through the second esterification reactor. Moreover, 1 N sodium hydroxide solution in 0.5% by weight as Na atoms was added and dispersed in an EG slurry of interpenetrating network type cross-linked fine polymer particles. At the same time, the EG slurry of interpenetrating network type cross-linked fine polymer particles was continuously supplied from another supply port which is different form that used for the supply of the above EG and EG solution of trimethylphosphate to the second esterification reactor so that the additional amount of the fine particles was 0.2% by

TABLE 1

| | Characterisitcs of interpenetrating network type cross-linked fine polymer particles | | | | Characteristics of oriented film | | | | | |
|---|---|---|---|---|---|---|---|---|---|---|
| | Component of interpenetrating network | Amount of component (wt %) | Average particle size (μm) | Adding amount of fine particles (ppm) | Degree of cross-linkage (%) | Ra (μm) | Slipperiness (class) | Wear resistance (class) | Δ μsd (class) | Δ μkd (class) | Number of large protrusions (class) |
| Example 1 | Polymethacrylic acid | 15 | 1.1 | 2000 | 9 | 0.022 | 4 | 4 | 4 | 4 | 5 |
| Example 2 | Polymethacrylic acid | 15 | 0.7 | 2000 | 9 | 0.015 | 4 | 5 | 4 | 4 | 5 |
| Example 3 | Polymethacrylic acid | 15 | 1.2 | 2000 | 17 | 0.023 | 4 | 4 | 4 | 4 | 5 |
| Example 4 | Polyacrylic acid | 15 | 1.1 | 2000 | 9 | 0.025 | 5 | 5 | 5 | 5 | 5 |
| Example 5 | Polyacrylic acid | 15 | 0.7 | 2000 | 9 | 0.018 | 4 | 5 | 4 | 4 | 5 |
| Example 6 | Polyacrylic acid | 15 | 1.2 | 2000 | 17 | 0.023 | 4 | 5 | 5 | 5 | 5 |
| Comparative Example 1 | — | 15 | 1.1 | 2000 | 9 | 0.026 | 5 | 3 | 3 | 3 | 2 |
| Comparative Example 2 | — | 15 | 0.7 | 2000 | 9 | 0.026 | 4 | 3 | 2 | 2 | 1 |
| Comparative Example 3 | — | 15 | 1.2 | 2000 | 17 | 0.028 | 5 | 3 | 3 | 3 | 2 |

As shown in Table 1, the films obtained in Examples 1 to 6 had few large protrusions and were excellent in surface flatness, slipperiness, wear resistance, and runnability. The films were found to have high quality.

Example 7

A continuous esterification reaction apparatus with a structure of two-tired complete mixing tank, comprising a stirring apparatus, dephlegmeter, inlet for charging materials, and outlet for taking out products was used. A slurry (having a molar ratio of EG to TPA of 1.7 and containing antimony trioxide, antimony atoms being 250 ppm per TPA unit) was continuously supplied from the supply port to a system in which the esterification reaction product of TPA and EG was present in the first esterification reactor of the reaction apparatus.

At the same time, an EG solution of $(CH_3COO)_2Mg \cdot 4H_2O$ was continuously supplied from another supply port to the system so that Mg atoms be 100 ppm per polyester unit of the reaction product passing through the weight. After that, the reaction product was allowed to react at atmospheric pressure under the conditions that the average retention time was 0.5 hours and the temperature was 260° C. The above interpenetrating network type cross-linked fine polymer particles had an area ratio of 92% with respect to circumscribed circles, a degree of variation of a particle size of 15%, and an average particle size of 1.1 μm. The fine particles comprises styrene, methyl methacrylate, divinylbenzene, and polymethacrylic acid. The degree of cross-linkage was 33%, and content of methyl methacrylate and content of polymethacrylic acid were 5% by weight and 15% by weight, respectively.

The esterification reaction product so obtained was continuously supplied to a two-tired continuous condensation polymerization reaction apparatus comprising a stirring apparatus, dephlegmeter, inlet for charging materials, and outlet for taking out products, and condensation polymerization was effected so as to obtain the polyester having an intrinsic viscosity of 0.620. The polyester so obtained was extruded by fusion at 290° C. to obtain an unstretched film.

This film was stretched 3.5-fold in the vertical direction at 90° C. and 3.5-fold in the horizontal direction at 130° C. After that, the polyester was heat-treated at 220° C. to obtain an oriented polyester film having a thickness of 15 μm.

Example 8

An oriented film was obtained in the same way as in Example 7 except that interpenetrating network type spherical cross-linked fine polymer particles (with a degree of cross-linkage of 23%, a content of 10% by weight of methacrylic acid, and a content of 15% by weight of polymethacrylic acid) having an average particle size of 1.3 μm, comprising styrene, methacrylic acid divinylbenzene, and polymethacrylic acid were use.

Surface flatness, slipperiness, wear resistance, runnability, and number of large protrusions of the polyester films obtained in Examples 7 and 8 were examined. The results are shown in Table 2.

A method for measurement of characteristics of the fine particles used and the polyester films obtained will be described below.

(7) Measurement of hydrophilic polymer in interpenetrating network type cross-linked fine polymer particles:

This measurement was performed in the same as described above.

(8) Measurement of area ratio of interpenetrating network type cross-linked fine polymer particle to circumscribed circle, particle size variation, and average particle size:

The interpenetrating network type cross-linked fine polymer particles ware observed by using a scanning electron microscope (Hitachi S-510). A Feret's diameter of each fine particle in the horizontal direction and a projected area and an area of a circle circumscribing a fine particle were calculated by using an image analysis apparatus (Luzex 500, NIRECO Co., Ltd.). An area ratio of the interpenetrating network type cross-linked fine polymer particle to the circumscribed circle, a particle size variation, and an average particle size were obtained from the following equations (I), (II), and (IV), respectively.

$$\text{Area ratio with respect to a circumscribed circle (\%)} = \frac{\text{Sum of projected areas of each particle}}{\text{sum of areas of circles circumscribing each particle}} \times 100 \quad \text{(I)}$$

$$\text{Average particle size (μm)} = \frac{\text{Sum of Feret's diameter of each particle in the horizontal direction}}{\text{Number of particle measured}} \times 100 \quad \text{(IV)}$$

(9) Average surface roughness of film (surface flatness):
This measurement was performed in the same way as in the above.

(10) Slipperiness of the film:
Coefficient of static friction between the films was measured under the conditions of 23° C. and relative humidity of 65% by using a thread type slip tester in accordance with ASTM D-1894-63.

(11) Wear resistance of the film:

A film which was slitted into a width of 12.5 mm was in contact with a commercially available razor and was traveled 10 m in the vertical direction with respect to the razor at 100 m/min. The amount of white powders that adhered to the razor was ranked by 4 grades as follows, thereby evaluating the wear resistance.

⊚: no white powder adhered

○: almost no white powder adhered

Δ: small amount of white powder adhered

×: great amount of white powder adhered (12) Runnability of film:

A polyester film 1 slitted into a ½ inch of width was provided to the apparatus by using a free roller 12 under the conditions of 23° C. and relative humidity of 65% as shown in FIG. 1. The polyester film 1 was fixed at an angle of 135° by using a commercially available fixed guide pin 14 (having a maximum protrusion height of 0.15 μm and a center line average height of 0.008 μm measured by a surface roughness tester of a tracer method type. After that, a weight 15 was provided at one and of the polyester film 1 and a constant weight of 50 g was applied thereto. Then, a crank 11 provided at the other end and was rotated at 10 rpm. The polyester film was traveled 150 times, after which coefficient of friction was measured. An absolute value ($\Delta\mu k$) of an increase in coefficient of friction from initial coefficient of friction was evaluated and ranked by 5 grades as follows.

⊚: less than 0.02

○: 0.02 to less than 0.05

Δ: 0.05 to less than 0.10

Δ~×: 0.10 to less than 0.15

×: 0.15 or more (13) Number of large particles in film:

A small amount of film was sandwiched between two cover glasses, pressed by fusion at 280° C., and than rapidly cooled. Particles in the film were observed by using a phase contrast microscope. Next, the particles were treated by using an image analysis apparatus (Luzex 500, NIRECO Co., Ltd.). In an image of the particles obtained, the number of the particles having a maximum length of 5 μm or more (number of particles per a measurement area of 4.8 mm$^2$) was counted, and ranked in accordance with the number of the particles as follows, thereby evaluating the number of the large particles.

×: 51 or more/4.8 mm$^2$

×~Δ: 21 to 50/4.8 mm$^2$

Δ: 11 to 20/4.8 mm$^2$

○: 4 to 10/4.8 mm$^2$

⊚: 0 to 3/4.8 mm$^2$

TABLE 2

Characteristics of interpenetrating network type cross-linked fine polymer particles

| | Component of interpenetrating network | | Copolymer component | | Degree of cross-linkage (%) | Particle size variation (%) | Average particle size (μm) | Adding amount of fine particles (wt %) | Characteristics of film | | | | |
|---|---|---|---|---|---|---|---|---|---|---|---|---|---|
| | Kind | Amount of component (wt %) | Kind | Content (wt %) | | | | | Ra (μm) | Slipperiness (class) | Wear resistance (class) | Runnability: Δ, k (clas) | (class) |
| Example 7 | Polymethacrylic acid | 15 | Methyl methacrylate | 5 | 33 | 92 | 15 | 1.1 | 0.20 | 0.021 | 0.35 | ⊚ | ⊚ | ⊚ |
| Example 8 | Polymethacrylic acid | 15 | Methacrylic acid | 10 | 23 | 95 | 10 | 1.3 | 0.20 | 0.020 | 0.36 | ⊚ | ⊚ | ⊚ |

As shown in Table 2, the polyester films obtained in Examples 7 and 8 were excellent in surface flatness, wear resistance, slipperiness, runnability, and number of large particles. The polyester films were found to have high quality.

Example 9

An esterification reactor was heated to 200° C. Then, 86.4 parts by weight of terephthalic acid and 64.6 parts by weight of ethylene glycol were charged in the reactor and as catalysts, 0.03 parts by weight of antimony trioxide, 0.088 parts by weight of $(CH_3COO)_2Mg.4H_2O$, and 0.16 parts by weight of triethylamine were charged while stirring. Then, the reactor was heated under pressure and esterification reaction upper pressure was effected at gauge pressure of 3.5 kg/cm$^2$ and 240° C., after which the reactor was returned to an atmospheric pressure and 0.043 parts by weight of trimethyl phosphate was added. Moreover, the reactor was heated to 260° C., and 15 minutes after the addition of trimethyl phosphate, as a content of particles, 1.0 part by weight of an ethylene glycol slurry of interpenetrating network type spherical cross-linked fine polymer particles (with a degree of cross-linkage of 23%, 10% by weight of methacrylic acid, and 15% by weight of polymethacrylic acid) having an average particle size of 0.5 μm, comprising as constituent components, styrene, methacrylic acid divinylbenzene, and polymethacrylic acid was added. Then, 15 minutes later, an esterification reaction product obtained was transferred to a polymerization condensation reactor, and a polymerization condensation reaction was effected under reduced pressure at 280° C. to obtain polyester having an intrinsic viscosity of 0.620. (polyester (A))

On the other hand, the polymerization was effected in the same way as in the above method for producing the polyester (A) except that 1.0 part by weight of alumina fine particles having a thermal conductivity of 0.045 cal/sec.cm.° C., protrusion formation ability of 2 protrusions/mm$^2$, and an average particle size of 0.08 μm was used instead of the interpenetrating network type cross-linked fine polymer particles, thereby obtaining polyester having an intrinsic viscosity of 0.620. (polyester (B))

Moreover, in the production of the above polyester (A), the addition of the interpenetrating network type cross-linked fine polymer particles was stopped to obtain polyester having an intrinsic viscosity of 0.620 containing no added fine particles. (polyester (C))

Next, the polyester (A), the polyester (B), and the polyester (C) were mixed in a weight ratio of 20:30:50 and dried.

After that, the mixture was extruded by fusion at 290° C., and stretched 3.5-fold in the vertical direction at 90° C. and 3.5-fold in the horizontal direction at 110° C., The mixture was then heat-treated at 220° C. to obtain an oriented polyester film having a thickness of 15 μm.

Example 10

An oriented film was obtained in the same way as in Example 9 except that hexagonal boron nitride fine particles having a thermal conductivity of 0.060 cal/sec.cm.° C., a protrusion formation ability of 4 protrusions/mm$^2$, and an average particles size of 0.09 μm as high thermal conductive fine particles used in the polyester (B).

Surface flatness, slipperiness, wear resistance and scratch resistance of the polyester films obtained in Example 9 and 10 were examined. The results are shown in Table 3.

A method for measurement of characteristics of the fine particles used and polyester films obtained will be described below.

(14) Average particle size of fine particles:

After thoroughly dispersing fine particles in an ethylene glycol slurry, a particle size distribution was measured by using a contrifugal particle size analyser (Shimadzu Seisakusho Co., Ltd. SA-CP3), and a value in which an accumulated value is 50% were used.

(15) Thermal conductivity of fine particles:

The fine particles-were molded by hot press, after which thermal conductivity was measured by a non-steady hot-wire method. A unit of thermal conductivity was cal/cm.sec.° C.

(16) Protrusion formation ability of fine particles:

A film containing only high thermal conductive fine particles in an amount 1% by weight with respect to a polyester was prepared. The surface of the film was vapor deposited with aluminum, and a field of 10 mm$^2$ or more was observed by using a two-flux interference microscope. The number of protrusions having a height of 0.27 μm or more was counted, and the number per 1 mm$^2$ was defined as a protrusion formation ability.

(17) Average surface roughness of film (surface flatness):

This measurement was performed in the same way as in the above.

(18) Slipperiness of film:

This measurement was performed in the same way as in Examples 7 and 8.

(19) Wear resistance of film:

This measurement was performed in the same way as in Examples 7 and 8.

Figure 2:
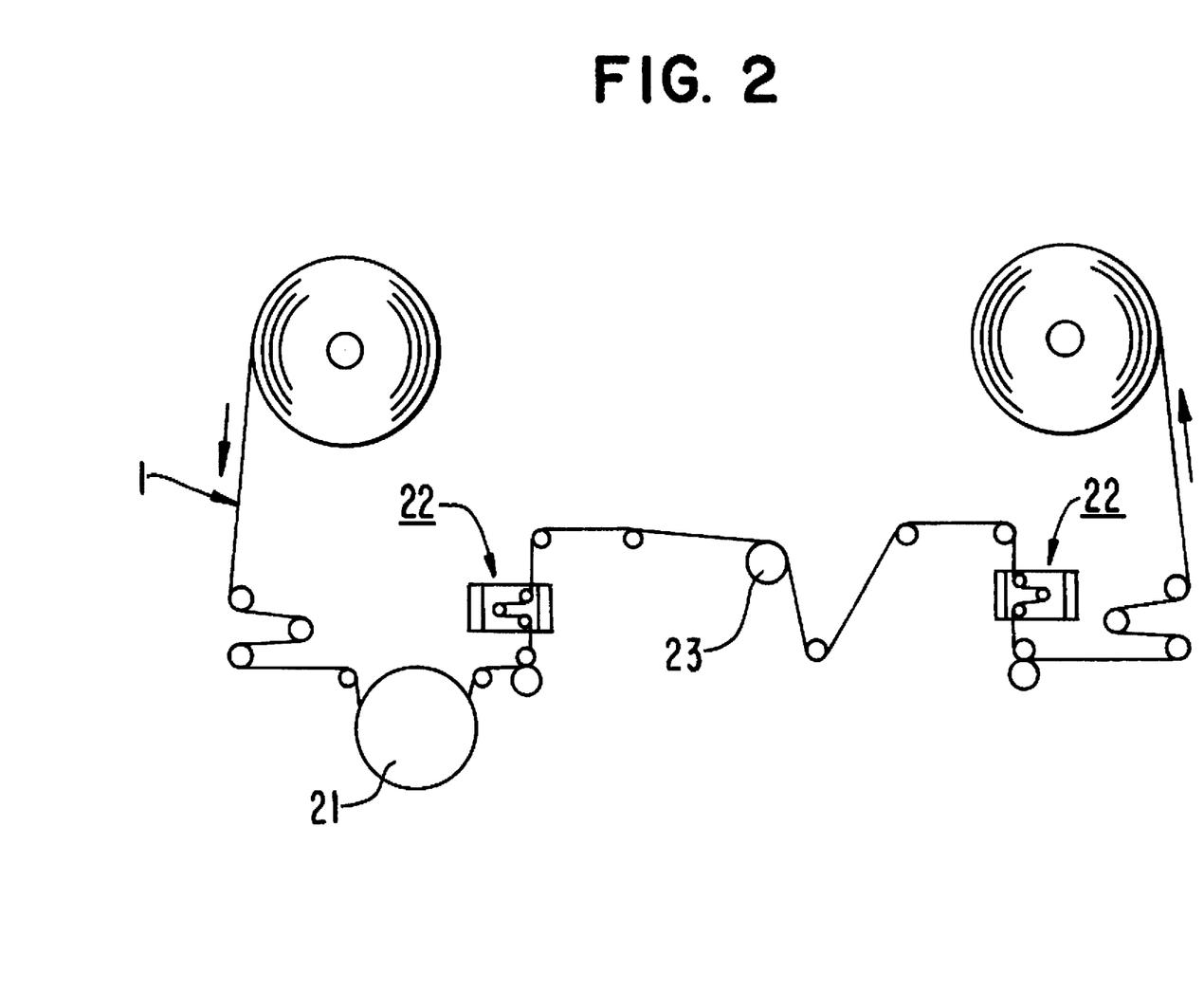
FIG. 2 is a schematic diagram showing an apparatus for evaluating scratch resistance of the film.

(20) Scratch resistance of film:

Scratch resistance was measured by using the apparatus shown in FIG. 2. In FIG. 2, the reference numeral 1 denotes a film, 21 a capstan, 22 a tension inspecting apparatus, 23 a fixed hard chrome plated metallic pin (surface roughness-3S).

The polyester film 1 slitted into a ½ inch width under the conditions of 23° C. and relative humidity of 65% was in contact with the fixed hard chrome plated metallic pin 23. A tension of 100 g was applied to the film 1, whereby the film 1 was traveled 90 m at 127 cm/sec. After the travel, the film 1 was vapor-deposited with aluminum. The whole width of the film was observed by using a microscope, and the amount of scratch was ranked as follows.

Amount of scratch

⊚: none

○: few

Δ: between ○ and ×

×: many

××: very many

Example 12

A biaxially oriented polyester film having a thickness of 2 μm was obtained in the same way as in Example 9. The film obtained had few voids and was found to be excellent in transparency, slipperiness, surface flatness, and breakdown voltage (Japanese Laid-Open Patent Publication No. 63-304047). The firm was found to be suitable for use as a condenser. Moreover, the film had satisfactory vapor deposition property, and was found to be suitable for wrapping.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside in the present invention, including all features that would be treated as equivalents thereof by those skilled in the art to which this invention pertains.

What is claimed is:

1. A film comprising a matrix polymer and fine polymer particles dispersed in said matrix polymer, wherein
said fine polymer particles are cross-linked fine polymer particles having hydrophilic polymers interpenetrated

TABLE 3

| | Fine particles for forming protrusions | | | | | Thermal conductive fine particle | | | Protrusion formation | Characteristics of film | | | |
|---|---|---|---|---|---|---|---|---|---|---|---|---|---|
| | Kind | Composition | Degree of cross-linkage (%) | Average particle size (μm) | Adding amount (wt %) | Kind | Thermal conductivity (cal/sec cm °C.) | Average particle size (wt %) | Adding amount (wt %) | ability (protrusion/mm) | Ra (μm) | Slipperiness (—) | Wear resistance | Scratch resistance |
| Example 9 | Interpenetrating network type cross-linked fine polymer particles | P(ST/MAA/DVB)/PMAA = 85(67/10/23)/15 | 23 | 0.5 | 0.20 | Alumina | 0.045 | 0.08 | 0.30 | 2 | 0.018 | 0.40 | ⊙ | ⊙ |
| Example 10 | interpenetrating network type cross-linked fine polymer particles | P(ST/MMA/DVB)/PMAA = 85(67/10/23)/15 | 23 | 0.5 | 0.20 | Hexagonal boron nitride | 0.060 | 0.09 | 0.30 | 4 | 0.018 | 0.38 | ⊙ | ⊙ |

*ST: Styrene, MAA: Methacrylic acid, DVB: Divinylbenzene, PMAA: Polymethacrylic acid As shown in Table 3, the polyesters in Examples 9 and 10 were excellent in surface flatness, slipperiness, wear resistance, and scratch resistance.

Example 11

First, 20 parts by weight of polyester chip containing 0.2 parts by weight of the interpenetrating network type crossliked fine polymer particles obtained in the same way as in Example 1 and a polyester chip separately prepared containing no added fine particles were blended. The mixture was extruded by fusion at 290° C. after being dried under a vacuum, and stretched 3.5-fold in the vertical direction and 3.7-fold in the horizontal direction. After that, the mixture was heat-treated at 230° C. to obtained a film having a thickness of 75 μm. The film so obtained was excellent in transparency and workability. Moreover, a microfilm prepared by a well-known method (for example, a method disclosed in Japanese Patent Publication No. 44-8402) was found to have an image of high quality when evaluated by a method in Japanese Patent Publication No. 2-28131). Thus, the film obtained in this example was suitable for use as a microfilm.

in networks of said fine polymer particles, said hydrophilic polymers contained in said networks in an amount 1 to 40% by weight based on the total weight of said fine polymer particles and not being substantially covalently bonded to said cross-linked fine polymer;

said cross-linked fine polymer is a vinyl polymer or a siloxane polymer comprising as its main components a polymerizable monomer and at least one cross-linking monomer contained in an amount of 5% by weight or more based on the total weight of the monomers; and
said fine polymer particles have an average particle size in the range of 0.01 to 5 μm and are contained in said film in an amount of 0.001 to 5.0% by weight.

2. A film according to claim 1, wherein said cross-linking monomer is a vinyl monomer having two or more vinyl groups in its molecule or a silicon compound having, in its molecule, three or more functional groups capable of forming siloxane bonds.

3. A film according to claim 1, wherein said cross-linked polymer is a copolymer comprising as its main components a styrene monomer and at least one vinyl monomer having two or more vinyl groups in its molecule.

4. A film according to claim 1, wherein said cross-linked polymer is a copolymer comprising as its main components a silicon compound having, in its molecule, three or more functional groups capable of forming siloxane bonds and a silicon compound having, in its molecule, two functional groups capable of forming siloxane bonds.

5. A film according to claim 1, wherein said film is an oriented polyester film.

6. A film according to claim 5, wherein said cross-linked polymer is a copolymer comprising as its main component a styrene monomer, a vinyl monomer having a functional group capable of covalently bonding to a polyester, and at least one vinyl monomer having two or more vinyl groups in its molecule.

7. A film according to claim 1, wherein said fine polymer particles have an average particle size in the range of 0.1 to 3 μm and are contained in said film in an amount of 0.01 to 5.0% by weight.

8. A film according to claim 1, wherein said fine polymer particles have an average particle size in the range of 0.1 to 3 μm and are contained in said film in an amount of 0.01 to 2.0% by weight, and additional fine particles having a protrusion formation ability of less than 10 protrusions/mm$^2$ are contained in said film in an amount of 0.05 to 2.0% by weight.

9. A film according to claim 8, wherein said fine particles having a protrusion formation ability of less than 10-protrusions/mm$^2$ are at least one fine particle selected from the group consisting of high thermal conductive fine particles having a thermal conductivity of 0.01 cal/cm sec °C. or more and said fine polymer particles of claim 1 having a particle size of less than 0.1 μm.

10. A film according to claim 9, wherein said high thermal conductive fine particles are made of a substance selected from the group consisting of beryllia, silicon carbide, aluminum nitride, titanium, spinel, alumina, magnesia, and boron nitride.

11. A film according to claim 1, wherein a temperature at which 5% weight decrease in said fine polymer particles is 350° C. or more in a thermal gravimetric decrease curve obtained by a thermal gravimetric analysis.

12. A film according to claim 1, wherein each of said fine polymer particles has an inorganic fine particle as a core in its particle.

13. An oriented polyester film having a plurality of layers, wherein at least one outermost layer of said film contains said fine polymer particles of claim 1.

14. A film according to claim 13, which is obtained by applying a coating solution containing said fine polymer particles and said matrix polymer of claim 1 onto a base film, drying said base film on which the coating solution is applied and stretching the dried film.

15. A film comprising a matrix polymer and fine polymer particles dispersed in said matrix polymer, wherein said fine polymer particles are cross-linked fine polymer particles having hydrophilic polymers interpenetrated in networks of said fine polymer particles, said hydrophilic polymers contained in said networks in an amount of 1 to 40% by weight based on the total weight of said fine polymer and particles and not being substantially covalently bonded to said cross-linked fine polymer;

said cross-linked fine polymer is a vinyl polymer or a siloxane polymer comprising as its main components a polymerizable monomer and at least one cross-linking monomer contained in an amount of 5% weight or more based on the total weight of the monomer; and said fine polymer particles have an average particle size in the range of 0.01 to 5 μm and are contained in said film in an amount of 0.001 to 5.0% by weight; said hydrophilic polymer is a water-soluble polymer or a water-dispersible polymer having at least one functional group selected from the group consisting of a carboxyl group, a sulfonic group, a hydroxyl group, and salts thereof.

16. A film comprising a matrix polymer and fine polymer particles dispersed in said matrix polymer, wherein said fine polymer particles are cross-linked fine polymer particles having hydrophilic polymers interpenetrated in networks of said fine polymer particles, said hydrophilic polymers contained in said networks in an amount of 1 to 40% by weight based on the total weight of said fine polymer particles and not being substantially covalently bonded to said cross-linked fine polymer;

said cross-linked fine polymer is a vinyl polymer or a siloxane polymer comprising as its main components a polymerizable monomer and at least one cross-linking monomer contained in an amount of 5% by weight or more based on the total weight of the monomers;

said fine polymer particles have an average particle size in the range of 0.01 to 5 μm and are contained in said film in an amount of 0.001 to 5.0% by weight; and said fine polymer particles have an area ratio of 80% or more with respect to a circumscribed circle defined as the following equation (I) and has a particle size variation of 20% of less defined as the following equation (II):

$$\text{Area ratio with respect to a circumscribed circle (\%)} = \frac{\text{Sum of projected areas of each particle}}{\text{sum of areas of circles circumscribing the projected view of each particle}} \times 100 \quad (I)$$

$$\text{Particle size variation (\%)} = \frac{\text{Standard deviation of particle size}}{\text{Average particle size}} \times 100 \quad (II)$$

* * * * *